Figure 1:
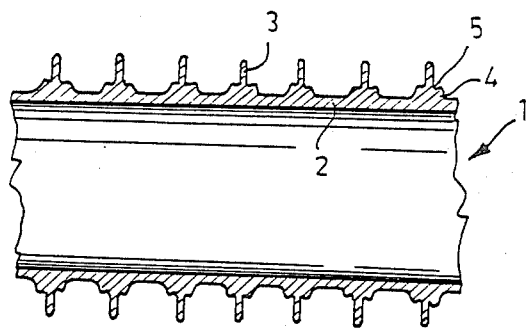

United States Patent [19]

Järvenkylä

[11] Patent Number: 4,690,174

[45] Date of Patent: Sep. 1, 1987

[54] PLASTIC PIPE

[75] Inventor: Jyri Järvenkylä, Tapiontie, Finland

[73] Assignee: Uponor N.V., St. Maarten, Netherlands Antilles

[21] Appl. No.: 883,543

[22] Filed: Jul. 8, 1986

[30] Foreign Application Priority Data

Jul. 30, 1985 [FI] Finland .................................. 852947

[51] Int. Cl.$^4$ .............................................. F16L 9/04
[52] U.S. Cl. .................................................. 138/121
[58] Field of Search ............... 138/121, 122, 103, 154, 138/172, 173; 165/184, 183, 181

[56] References Cited

U.S. PATENT DOCUMENTS

| 3,122,171 | 2/1964 | Britton et al. | 138/122 |
| 3,406,724 | 10/1968 | Carlstrom et al. | |
| 3,500,902 | 3/1970 | Habdas | 165/184 |
| 3,861,152 | 1/1975 | Maroschak | 138/121 |
| 4,362,187 | 12/1982 | Harris et al. | 138/122 |
| 4,566,496 | 1/1986 | Menzel et al. | 138/154 |

FOREIGN PATENT DOCUMENTS

| 83035212 | 6/1963 | Sweden. | |
| 2015114 | 9/1979 | United Kingdom | 138/132 |
| 0574573 | 9/1977 | U.S.S.R. | 138/121 |

Primary Examiner—Stephen Marcus
Assistant Examiner—Leo J. Peters
Attorney, Agent, or Firm—Ladas & Parry

[57] ABSTRACT

This invention relates to a plastic pipe. The wall thickness of this kind of pipes is very small and, consequently, the impact strength is poor. The impact strength of pipes made of polyvinyl chloride can be improved by adding an admixture to the raw material, which, however, increases costs. According to the invention the impact strength can be improved by a ring-shaped elevation formed at the foot of the ribs on both sides thereof, which elevation joins the side wall of the rib over a sharp transitional juncture.

10 Claims, 4 Drawing Figures

U.S. Patent  Sep. 1, 1987  4,690,174

PLASTIC PIPE

This invention relates to a plastic pipe having a pipe wall with an outer face provided with mutually spaced ribs extending essentially at right angles to the pipe wall.

Pipes made of polyvinyl chloride (hereinafter sometimes PVC) are widely used as drain pipes. As to the shape of the outer face of the pipe wall, there are two types of pipes: smooth pipes and ribbed pipes. Smooth pipes are easy to manufacture, but they require quite a lot of raw material since the ring stiffness and the impact strength of the pipe can be affected only by increasing the wall thickness.

Therefore ribbed pipes have been developed in which the ring stiffness is achieved by means of ribs, whereby the wall thickness of the pipe can be considerably reduced. As compared with a smooth pipe, a disadvantage of a ribbed pipe, however, is a lower impact strength, because the impact strength is directly proportional to the wall thickness and inversely proportional to the ring stiffness. A low impact strength manifests itself in practice in such a manner that when a rib is exposed to an impact, it is usually inclined in the sideward direction, and a fracture surface extending at an angle of about 45° inwards from the foot of the rib is formed in the pipe wall. If the impact is sufficiently forceful, this fracture surface extends to the inner face of the pipe, whereby a point of leakage is formed in the pipe. The impact strength of a ribbed pipe can be improved by adding an admixture having impact strength improving properties, e.g. chlorinated polyethene, to the PVC material so that it is not necessary to increase the wall thickness. To sum up, ribbed pipes require less raw material than smooth pipes, but the overall saving is insignificant as the material in ribbed pipes is more expensive due to the high price of the admixture.

SE Patent Application No. 8 303 521-2 discloses an alternative solution, wherein the ribs are hollow and resilient. The manufacture of such a pipe, however, is rather expensive, and the use of the admixture mentioned above cannot be fully avoided.

The object of the present invention is to provide a ribbed pipe the impact strength of which is improved in a manner more simple and inexpensive than previously. The pipe according to the invention is characterized in that the pipe wall is provided with elevations joining both side walls of the ribs, said elevations extending essentially over the entire length of the ribs, and that the juncture between the side wall of the rib and an outer face of the elevation is sharp.

By virtue of the elevations, which join the ribs along a sharp juncture line, the fracture point of the ribs is displaced away from the wall of the pipe, wherefore the fracture seldom reaches the inner face of the pipe. The sharp juncture ensures that the rib does fracture at the juncture line. Tests carried out show that the impact strength of the pipe according to the invention is twofold as compared with a known pipe of equal size. The material consumption is essentially equal to that of known pipes of the same type, because the material for the elevations can be taken from the wall of the pipe, which can be thinner than previously. A major saving is obtained in that it is not necessary to add any expensive admixture having impact strength improving properties to the PVC material. The impact strength of the pipe is also improved as the elevation distributes the impact energy over a wider area than previously. Furthermore, the elevation provides an additional reinforcement for the pipe.

The outer face of the elevation of one preferred embodiment of the invention is inclined in relation to the outer face of the pipe so that the distance thereof from the outer face of the pipe is increased in the direction away from the rib. As a result thereof, a notch is formed between the outermost point of the elevation and the rib, the notch having a sharp angle at the juncture line. This kind of notch efficiently ensures that the rib does fracture at the juncture point, since it is well-known that polyvinyl chloride is susceptible to the notch effect, i.e. it fractures at a notch more eaily than other plastic pipe materials. So the invention utilizes this particular drawback of the PVC material. If desired, it can be further ensured that the rib will fracture at the juncture point by adding thereto a suitable filler, i.e. notch-effect-heightening, material, such as e.g. chalk, 5 to 30 percent.

According to the invention the juncture point between the elevation and the rib is sharp and, according to one preferred embodiment, the radius of the rounding of the juncture is not more than about 10 percent of the thickness of the rib.

In view of the operation of the structure according to the invention, it is essential that the impact really causes the rib to be fractured at the foot of the rib and not over a wider area. Therefore the width of the rib must not increase to any greater degree towards the wall of the pipe, and it is desirable for the invention that the inclination of the side walls of the rib with respect to a plane extending transversely to the pipe wall is not more than about 3°.

According to the invention it is also essential that the impact causes the rib to bend sidewards so that it will not thrust directly inside the pipe. For this reason, the free end of the rib preferably has a semi-circular cross-section.

Figure 2:
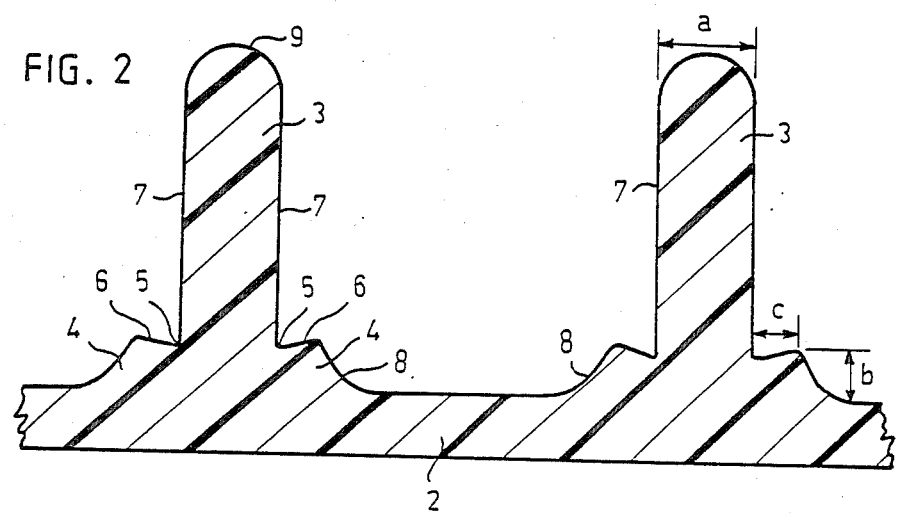
Figure 3:
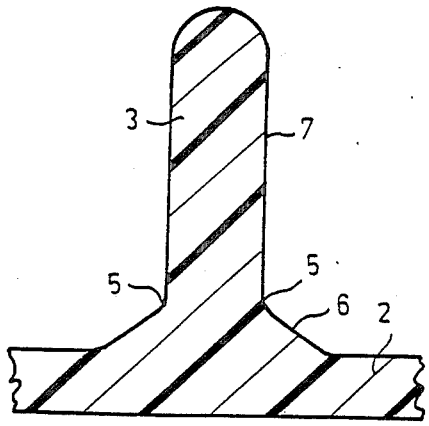
Figure 4:
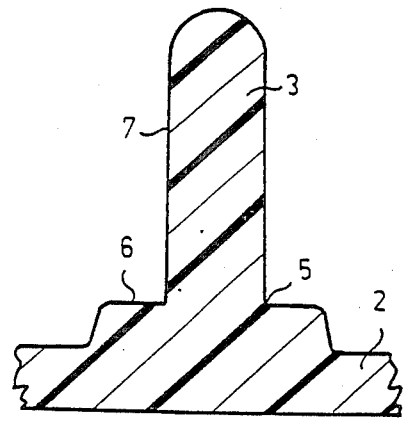

The plastic pipe according to the invention will be described more closely below with reference to the attached drawing, wherein FIG. 1 is a longitudinal section of a pipe according to the invention, FIG. 2 an enlarged longitudinal section of one portion of the pipe of FIG. 1, FIG. 3 is an enlarged longitudinal section of a portion of a second embodiment, and FIG. 4 is an enlarged longitudinal section of a portion of a third embodiment.

FIG. 1 illustrates a ribbed pipe 1 manufactured of polyvinyl chloride and comprising a pipe, i.e., tubular wall 2. The inner face of the wall is smooth, while the outer face thereof is provided with mutually, i.e., axially spaced ribs 3 extending, i.e., protruding in the direction of the periphery, i.e., circumferentially. The ribs 3 are preferably ring-shaped.

FIG. 2 illustrates the preferred embodiment of the invention on an enlarged scale. According to the invention an elevation 4 is provided on each side of each rib 3, which elevation extends over the whole length of the rib, i.e., circumferentially of the outer face of the pipe wall, and joins one of axially-opposite, i.e., side walls 7 of the rib at a sharp juncture angle, i.e., a line 5.

The elevations 4 are integral with the pipe wall 2 and the ribs 3, being formed simultaneously with the other parts of the pipe. An outer face 6 of each elevation is adjoined to a side wall 7 of a respective rib and inclined with respect to the outer face of the pipe wall in such a manner that the radial distance thereof from the outer face of the pipewall increases in the axial direction away from the respective rib. By virtue of this inclination, a notch is provided between the faces 6 and 7, which notch makes it more likely that the rib will be fractured at the juncture line 5. The angle between the faces 6 and 7 is, as appears from FIG. 2, smaller than 90°. A face 8 of the elevation joins the outer face of the pipe, i.e., the elevation is from only an axial portion of the outer face of the pipe wall, smoothly so that a supporting surface as wide as possible is provided for the rib 3.

Tests carried out show that a suitable radius of rounding of the juncture 5 is at the most about 10 percent of the thickness a of the rib 3, in practice usually between 0.1 and 0.5 mm, preferably about 0.2 mm. The greatest height b and width c of the elevations 4 are preferably about half of the thickness a of the rib, i.e. in practice usually about 2 mm.

In view of the operation of a pipe manufacturing machine, it is desirable that the thickness a of the ribs 3 increases towards the wall of the pipe. On the contrary, it is of advantage in view of the operation of the pipe according to the invention that the inclination of the side walls 7 of the rib with respect to a plane extending transversely to the pipe wall does not exceed 3°. It is also desirable in view of the operation of the invention that the free end 9 of the rib has a semi-circular cross-section.

FIG. 3 illustrates a second embodiment of the pipe according to the invention. It differs from the embodiment of FIG. 2 in that the outer face 6' of the elevation extends from the side wall 7' of the rib to the outer face of the pipe wall in a roughly planar form so that the angle between the faces 6' and 7' is obtuse. In spite of this, the present embodiment, too, operates in a manner according to the invention, since the juncture line 5' is sharp, i.e. the radius of the rounding thereof is very small.

FIG. 4 illustrates an intermediate form of the embodiments described above; the outer face 6'' of the elevation extends therein in parallel with the pipe wall 2 so that the angle between the faces 6'' and 7'' is 90°. In this case, too, the juncture between the faces is sharp.

When the pipe according to the invention is exposed to an impact in the sideward direction, a usually curved fracture surface is formed in the ribs 3, which receive the impact, the deepest point of the fracture surface being positioned in level with the juncture 5, from which the surface extends along a curved line upwards up to the outer end of the rib. Because the fracture surface does not usually extend up to the inner face of the pipe wall, no point of leakage is formed in the pipe.

What I claim is:

1. A plastic pipe comprising a tubular wall having an inner and an outer face, mutually spaced circumfential ribs having side walls protruding from said outer face and extending at substantially right angles with said wall and circumfential elevations protruding from said outer face of the wall and being integral with said pipe wall and said ribs, the elevations having an outer face joining both the side walls of the ribs, and the juncture between the side walls of said ribs and the outer face of said elevations being sharp.

2. A plastic pipe according to claim 1 wherein the outer face of at least one of the elevations is inclined with respect to the outer face of the pipe wall in such a manner that the radial distance thereof from the outer face of the pipe wall increases in the axial direction away from the side face of the rib it respectively joins.

3. A plastic pipe according to claim 1, wherein the outer face of at least one of the elevations is inclined with respect to the outer face of the pipe wall in such a manner that the radial distance thereof from the outer face of the pipe wall decreases in the axial direction away from the side face of the rib it respectively joins.

4. A plastic pipe according to claim 1, wherein the outer face of at least one of the elevations extends in parallel with the outer face of the pipe.

5. A plastic pipe according to claim 1, wherein the juncture of the outer face of each elevation and the side wall of the rib it joins has a radius of rounding not more than about 10 percent of the thickness of the rib.

6. A plastic pipe according to claim 1, wherein the width of each elevation is about half of the thickness of each rib.

7. A plastic pipe according to claim 1, wherein each rib protrudes to a free end, the free end of each rib having a semi-circular cross-section.

8. A plastic pipe according to claim 1, wherein each rib protrudes to a free end thereof, the thickness of each rib increasing from the free end of the rib towards the pipe wall, the side walls of each rib being inclined with respect to a plane extending transversely to the pipe wall not more than about 3°.

9. A plastic pipe according to claim 1, made of polyvinyl chloride comprising 5 to 30 percent of a material which heightens the notch effect thereof.

10. A plastic pipe according to claim 1, wherein the greatest height of said elevations, measured from the outer face of the pipe, is about half the thickness of said ribs.

* * * * *